US008571306B2

(12) United States Patent
Reznik et al.

(10) Patent No.: US 8,571,306 B2
(45) Date of Patent: Oct. 29, 2013

(54) CODING OF FEATURE LOCATION INFORMATION

(75) Inventors: Yuriy Reznik, San Diego, CA (US); Onur C Hamsici, La Jolla, CA (US); Sundeep Vaddadi, San Diego, CA (US); John H Hong, San Clemente, CA (US); Chong U Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 13/229,654

(22) Filed: Sep. 9, 2011

(65) Prior Publication Data

US 2013/0039566 A1 Feb. 14, 2013

Related U.S. Application Data

(60) Provisional application No. 61/522,171, filed on Aug. 10, 2011.

(51) Int. Cl.
*G06K 9/00* (2006.01)

(52) U.S. Cl.
USPC .......................................... 382/154

(58) Field of Classification Search
None
See application file for complete search history.

(56) References Cited

U.S. PATENT DOCUMENTS

| 7,330,606 | B2 | 2/2008 | Yakhini et al. |
| 7,876,959 | B2 | 1/2011 | Matsuda et al. |
| 7,894,668 | B1 | 2/2011 | Boitano |
| 2006/0104266 | A1* | 5/2006 | Pelletier et al. ............... 370/389 |
| 2008/0101464 | A1* | 5/2008 | Lei ........................... 375/240.03 |
| 2010/0284577 | A1 | 11/2010 | Hua et al. |
| 2010/0303354 | A1* | 12/2010 | Reznik ......................... 382/168 |
| 2011/0175994 | A1 | 7/2011 | Genovesio et al. |

FOREIGN PATENT DOCUMENTS

JP         07046599 A  *  2/1995

OTHER PUBLICATIONS

Sam S. Tsai, David Chen, Gabriel Takacs, Vijay Chandrasekhar, Jatinder P. Singh, and Bernd Girod. 2009. Location coding for mobile image retrieval. In Proceedings of the 5th International ICST Mobile Multimedia Communications Conference.*
Bay, et al., "Speeded-Up Robust Features (SURF)," ScienceDirect, www.elsevier.com/locate/cviu, 2007, p. 346-359.
Chandrasekhar, "Compressed Histogram of Gradients: A Low-Bitrate Descriptor," Int J Comput Vis, 2011, DOI 10.1007/s11263-011-0453-z.
Conway, et al., "Fast Quantizing and Decoding Algorithms for Lattice Quantizers and Codes," IEEE Transactions on Information Theory, vol. IT-28, No. 2, 1982.

(Continued)

Primary Examiner — Nirav G Patel
(74) Attorney, Agent, or Firm — Silicon Valley Patent Group LLP

(57) ABSTRACT

Methods and devices for coding of feature locations are disclosed. In one embodiment, a method of coding feature location information of an image includes generating a hexagonal grid, where the hexagonal grid includes a plurality of hexagonal cells, quantizing feature locations of an image using the hexagonal grid, generating a histogram to record occurrences of feature locations in each hexagonal cell, and encoding the histogram in accordance with the occurrences of feature locations in each hexagonal cell. The method of encoding the histogram includes applying context information of neighboring hexagonal cells to encode information of a subsequent hexagonal cell to be encoded in the histogram, where the context information includes context information from first order neighbors and context information from second order neighbors of the subsequent hexagonal cell to be encoded.

34 Claims, 10 Drawing Sheets

(56) References Cited

OTHER PUBLICATIONS

Cover, "Enumerative Source Encoding,", IEEE Transactions on Information Theory, Jan. 1973, p. 73-77.

Lowe, "Distinctive Image Features from Scale-Invariant Keypoints," International Journal of Computer Vision, 2004, p. 1-28.

Girod, et al., "Mobile Visual Search: Architectures, Technologies, and the Emerging MPEG Standard," IEEE Computer Society, 2011, p. 2-10.

\* cited by examiner

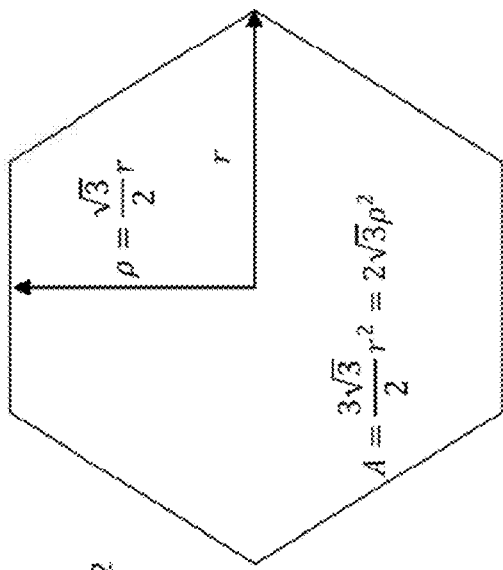
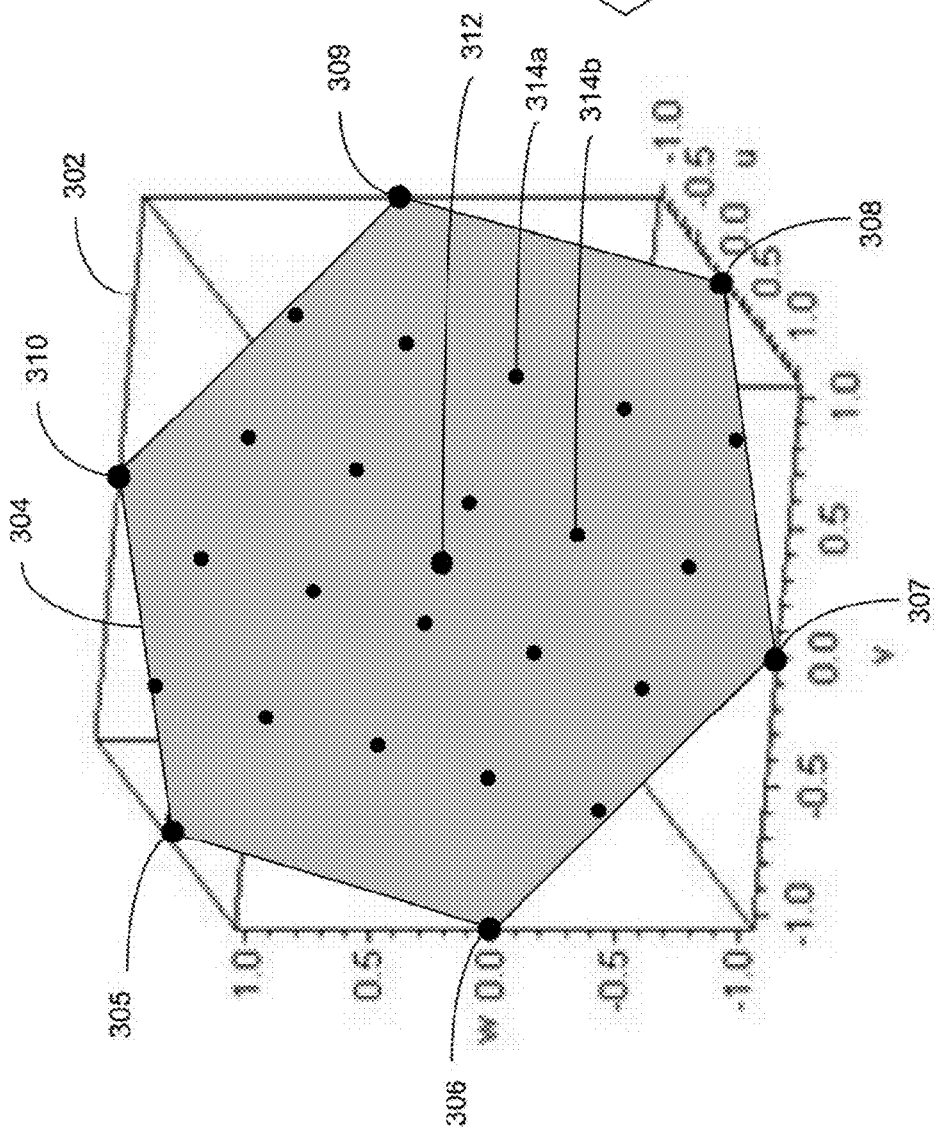
Figure 3b
Figure 3a

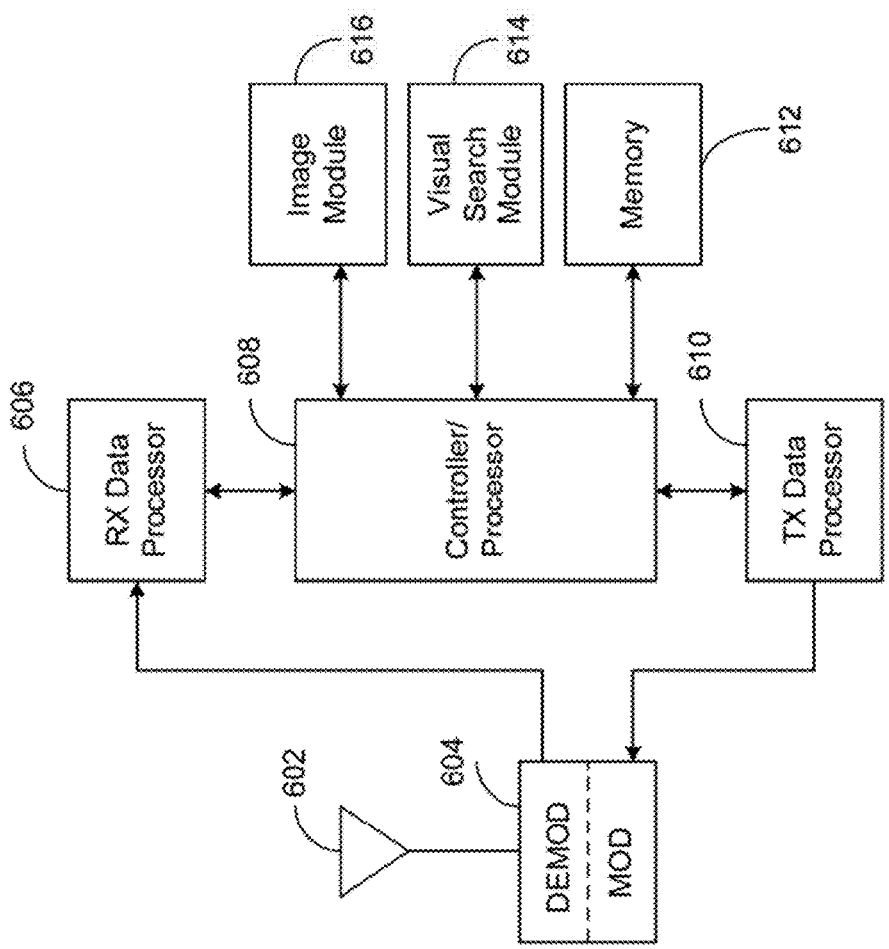

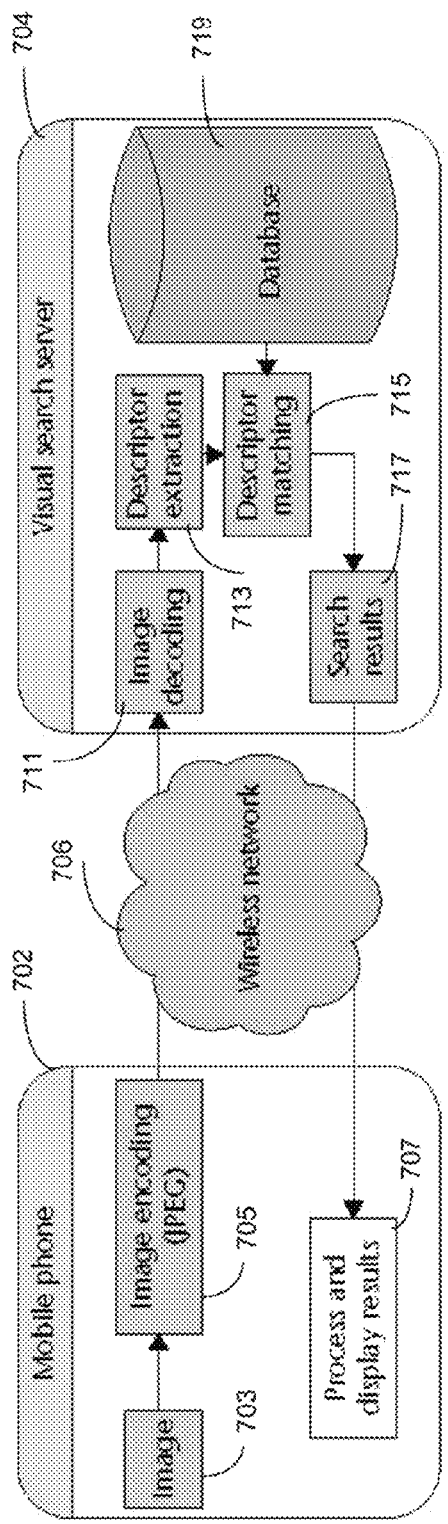
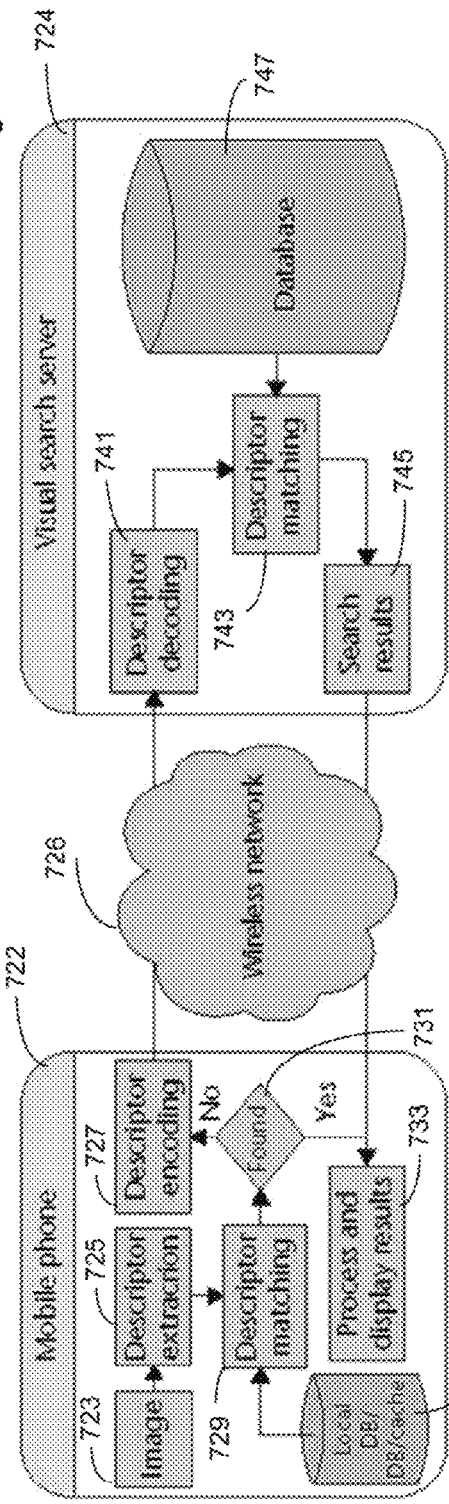
Figure 7a
Figure 7b

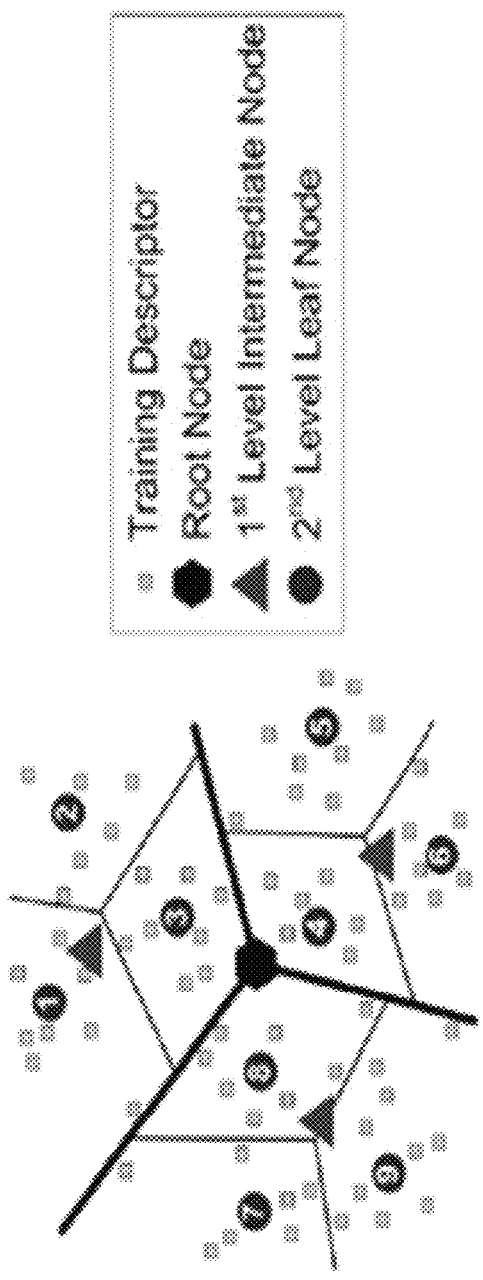
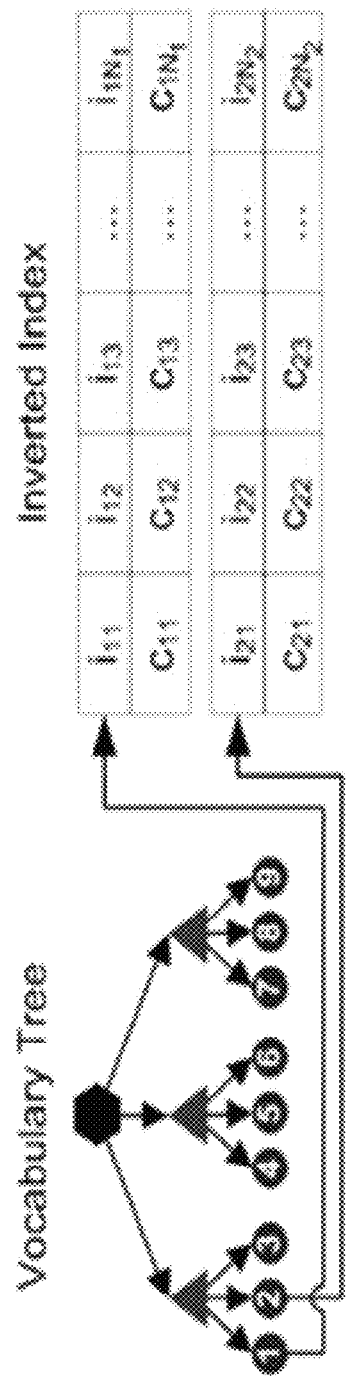
Figure 8a
Figure 8b

CODING OF FEATURE LOCATION INFORMATION

CROSS REFERENCE TO RELATED APPLICATIONS

This application claims the benefit of U.S. provisional application No. 61/522,171, "Coding of Feature Location Information" filed Aug. 10, 2011. The aforementioned United States application is hereby incorporated by reference in its entirety.

FIELD

The present disclosure relates to the field of processing digital image data. In particular, the present disclosure relates to coding of feature location information of an image.

BACKGROUND

As camera-phones and personal digital assistances (PDAs) are being widely adopted in the marketplace, they become the ubiquitous platforms for visual search and mobile augmented reality applications. To support an application that requires image comparison, information either need to be uploaded from a mobile device to a server, or downloaded from the server to the mobile device. The amount of data to be transmitted and/or received over the wireless network becomes critical to the performance and ease-of-use of such applications.

Conventional feature-based retrieval systems typically employ a straightforward scheme for coding location information. In such systems, (x, y) coordinates of each feature are quantized to some fixed resolution, such as 8 bits per feature location. Then such quantized (x, y) pairs are stored and transmitted. For example, with an image having one thousand features and an 8-bit resolution is used, this scheme would require about 2K bytes of data per image. Such data coding scheme results in large amount of data need to be transmitted over the wireless network, which in turn adversely affects the performance and ease-of-use for visual search and mobile augmented reality applications.

Therefore, there is a need for systems and methods for coding feature location information that can address the above issues of conventional systems.

SUMMARY

The present disclosure relates to coding of feature location information of an image. According to embodiments of the present disclosure, a method of coding feature location information of an image includes generating a hexagonal grid, which includes a plurality of hexagonal cells, quantizing feature locations of an image using the hexagonal grid, generating a histogram to record occurrence of feature locations in each hexagonal cell, and encoding the histogram in accordance with the number of occurrences of feature locations in each hexagonal cell.

The method of generating a hexagonal grid includes determining size of the hexagonal cells in accordance with a predetermined quantization level of the feature location information. The method of quantizing feature locations includes performing a transformation of coordinates of each feature location from a two dimensional plane to a three dimensional space, rounding the transformed coordinates to corresponding nearest integers, and verifying the transformed coordinates belong to a hexagonal plane in the three dimensional space. Note that the transformation is reversible. To verify the transformed coordinates belong to a hexagonal plane in the three dimensional space, the method computes a sum of the transformed coordinates, and verifies that the sum of the transformed coordinates equals to zero.

The method of generating a histogram includes generating a histogram map configured to include occurrences of feature locations in each hexagonal cell, and generating a histogram count configured to describe number of occurrences of feature locations in each hexagonal cell. The method of encoding the histogram may include applying context information of neighboring hexagonal cells to encode information of a subsequent hexagonal cell to be encoded in the histogram, where the context information includes context information from first order neighbors and context information from second order neighbors of the subsequent hexagonal cell to be encoded.

In another embodiment, a mobile device includes an image module configured to obtain an image, a visual search module configured to generate encoded feature location information of the image, and a controller configured to communicate the encoded feature location information of the image to a server via a wireless network. The visual search module of the mobile device includes logic for generating a hexagonal grid, wherein the hexagonal grid includes a plurality of hexagonal cells, logic for quantizing feature locations of an image using the hexagonal grid, logic for generating a histogram to record occurrences of feature locations in each hexagonal cell, and logic for encoding the histogram in accordance with the occurrences of feature locations in each hexagonal cell.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 3a illustrates a method of representing feature location information with a hexagonal plane in a three dimensional (3D) space according to some aspects of the present disclosure.

FIG. 3b illustrates characteristics of a hexagonal cell according to some aspects of the present disclosure.

FIG. 6a illustrates a block diagram of a mobile device configured to perform visual search according to some aspects of the present disclosure.

FIGS. 7a-7b illustrate exemplary implementations of visual search functionality according to embodiments of the present disclosure.

FIGS. 8*a*-8*b* illustrate using vocabulary tree and an associated inverted index in feature location indexing according to embodiments of the present disclosure.

DESCRIPTION OF EMBODIMENTS

Embodiments of coding feature location information are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Figure 1A:
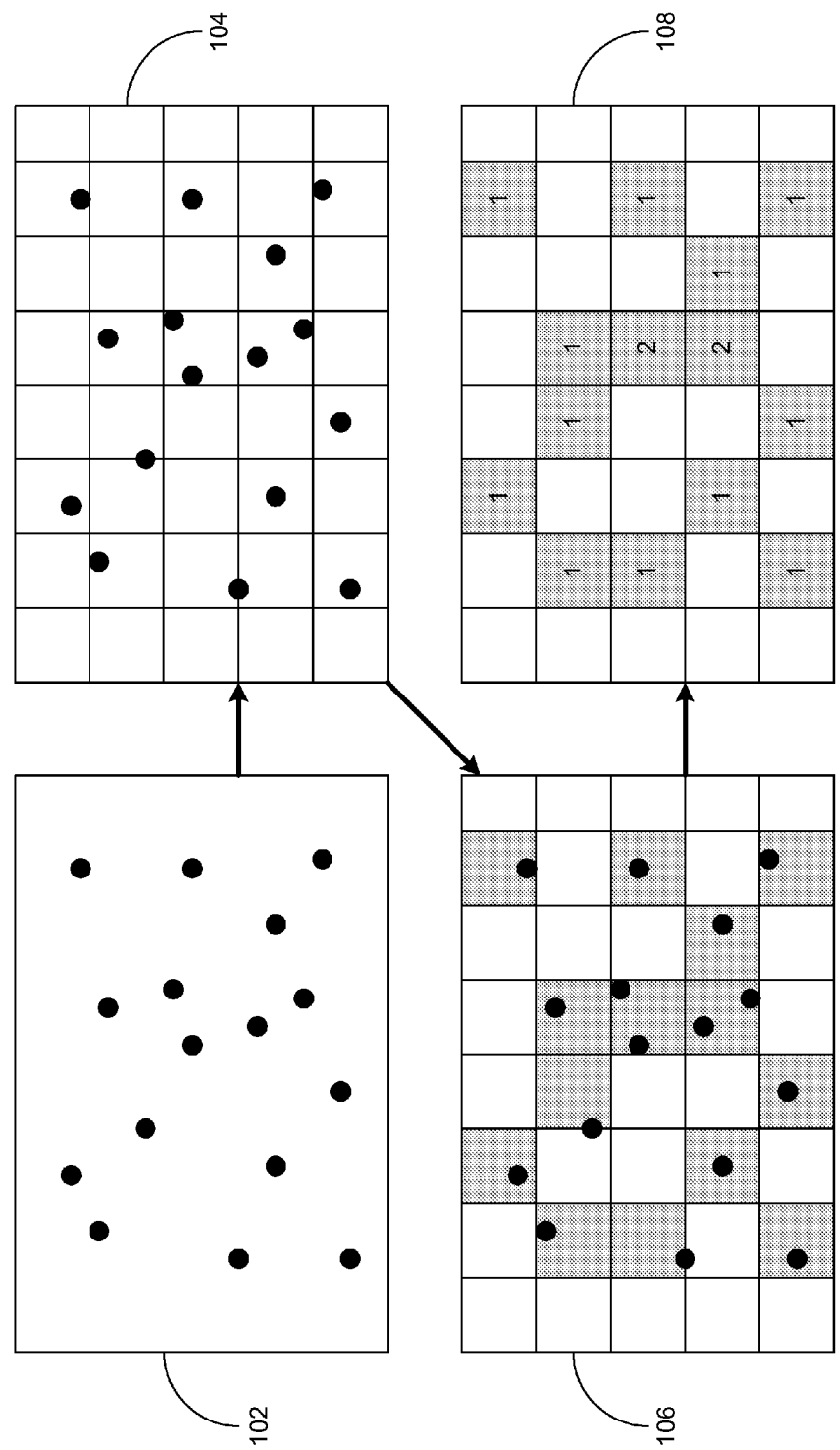
FIGS. 1a-1b illustrate a method of generating a feature location histogram according to some aspects of the present disclosure.

FIG. 1*a* illustrates a method of generating a feature location histogram using rectangular grid as described by Tsai et. al. "Location coding for mobile image retrieval systems," in *Proceedings of International Mobile Multimedia Communications Conference*, September 2009. This reference is incorporated herein in its entirety by reference. In 102, black dots represent features of an image. In 104, the image is overlaid with a square grid, where the square grid includes multiple square cells. Depending on the application, the size of each square cell can vary from 2×2 square pixels to 32×32 square pixels. In 106, a histogram map is generated to show locations of features of the image. Cells in the histogram map that contain black dots are shown in gray, and cells that contain no black dots are shown in white. In the event a feature lies on a boundary between two square cells, the square cell that contains a larger area of the feature is selected. In the event that a feature is equally distributed between two cells, either one of the cells can be selected. In 108, a histogram count is generated based on the histogram map of 106. The number in a square cell represents the number of features fall in that cell in the histogram map of 106.

According to embodiments of the present disclosure, let n denotes the number of features of an image, and let m denotes the number of cells in the histogram. Then, given a video graphics array (VGA) image and using Scale-Invariant Feature Transform (SIFT) or Speed Up Robust Feature (SURF), for n=1000, then m=640*480/w², where w is the size of the cell (in pixels).

Note that the notion of multiset, in which members are allowed to appear more than once, may be used to represent histogram of feature location information. The number of times an element belongs to the multiset is the multiplicity of that member. The total number of elements in a multiset, including repeated members, is the cardinality of the multiset. For example, in the multiset {a, a, b, b, b, c} the multiplicities of the members a, b, and c are respectively 2, 3, and 1, and the cardinality of the multiset is 6.

In the example shown in FIG. 1*a*, the number of multisets of cardinality n, with elements taken from a finite set of cardinality m, is the multiset coefficient or multiset number. The number of possible histograms with m cells and n total are given by a multiset coefficient:

$$\left(\!\!\binom{m}{n}\!\!\right) = \binom{n+m-1}{m-1}.$$

Consequently, assuming equal probability of all histograms, it may take about $$R(m, n) = \log_2\binom{n+m-1}{m-1} = \begin{cases} n\log_2 m - \log_2 n! + O(m^{-1}) & \text{if } m \gg n \\ (1+\alpha)H\left(\dfrac{1}{1+\alpha}\right)m + O(\log m) & \text{if } n = \alpha m \\ (m-1)\log_2 n - \log_2(m-1)! + O(n^{-1}) & \text{if } n \gg m \end{cases}$$

bits to encode it. In the above expressions, O represents the Big O notation, which describes the limiting behavior of the function when the argument tends towards a particular value or infinity, usually in terms of simpler functions. The Big O notation characterizes functions according to their growth rates such that different functions with the same growth rate may be represented using the same O notation. Also, it is assumed that $\alpha$ is a constant and that H (.) is an entropy function such that:

$$H(x) = -x \log x - (1-x)\log(1-x).$$

Figure 1B:
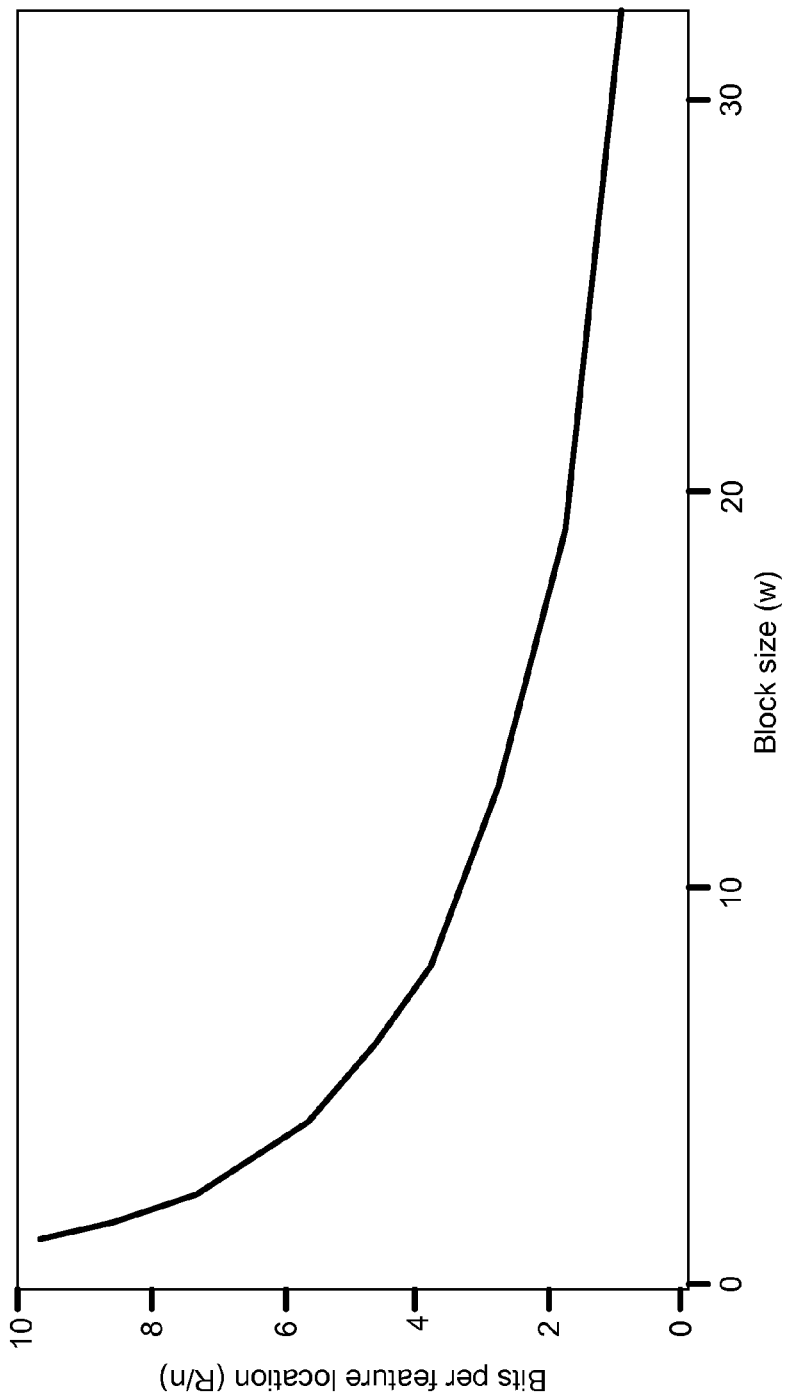

Numbers obtained by using this formula is shown for n=1000, and m=640*480/w², where w represents location histogram block size. A plot of bits-per-feature-location versus location-histogram-block-size w is shown in FIG. 1*b*. In this plot, when the block size is small (e.g. 2 pixels), the rate of coding of feature-location information is large (about 8 bits/feature). As the block size increases, the rate of coding of feature-location information decreases. When the block size is about 30 pixels, the coding rate is about 1 bits/feature. FIG. 1*b* contains empirical entropy estimates reported in Tsai et. al. Note that empirical entropy estimates do not account for cost of transmission of model information, and therefore they fall slightly below the curve predicted by the above formula. In general, they follow a similar trend with respect to location histogram block size w.

Also note that distortion (covering radius) introduced by this scheme can be directly proportional to the block size w and for a given point q and its corresponding reconstructed point q', it is:

$$\varepsilon_\infty = \max_{q\, \in\, cell\ with\ center\ q'} \|q - q'\|_\infty = \frac{1}{2}w,$$

$$\varepsilon_2 = \max_{q\, \in\, cell\ with\ center\ q'} \|q - q'\|_2 = \frac{1}{\sqrt{2}}w,$$

$$\varepsilon_1 = \max_{q\, \in\, cell\ with\ center\ q'} \|q - q'\|_1 = w.$$

Using the above relations, rate-distortion characteristic for histogram location coding (e.g. for $L_2$ norms) can be expressed as:

$$R(\varepsilon_2) = \log\binom{n - m(\varepsilon_2) - 1}{m(\varepsilon_2) - 1} =$$

$$\log\left(\dfrac{n - \dfrac{WH}{2\varepsilon_2^2} - 1}{\dfrac{WH}{2\varepsilon_2^2} - 1}\right) \sim n \log\dfrac{WH}{2\varepsilon_2^2} - \log n! \sim n\left(\log\dfrac{WH}{2\varepsilon_2^2 n} - 1\right)$$

where W and H denote width and height of input image, n is the number of features, and where the right side asymptotic expression is obtained for high-fidelity ($\epsilon \to 0$) regime.

Figure 2:
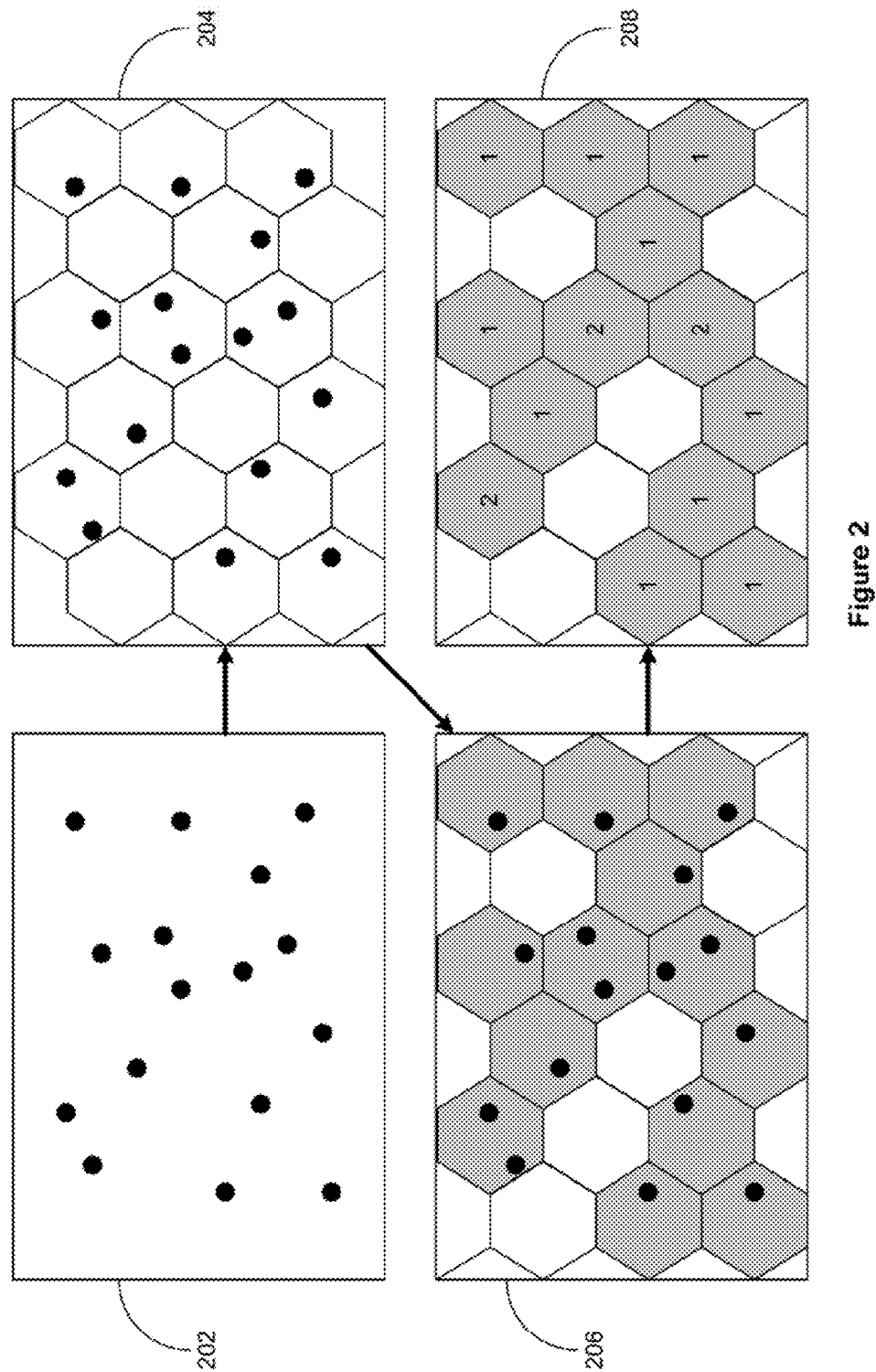
FIG. 2 illustrates another method of generating a feature location histogram according to some aspects of the present disclosure.

FIG. 2 illustrates another method of generating a feature location histogram according to some aspects of the present disclosure. In 202, black dots represent features of an image. In 204, the image is overlaid with a hexagonal grid (also referred to as hexagonal lattice), where the hexagonal grid includes multiple hexagonal cells. In 206, a histogram map can be formed to show locations of features of the image. In this example, cells in the histogram map that contain black dots are shown in gray, and cells that contain no black dots are shown in white. In the event a feature lies on a boundary between two hexagonal cells, the hexagonal cell that contains a larger area of the feature is selected. In the event that a feature is equally distributed between two cells, either one of the cells can be selected. In 208, a histogram count can be formed based on the histogram map of 206. A number in a hexagonal cell represents the number of features falls in that cell in the histogram map of 206. Note that different sizes of hexagonal cells can be employed to yield different quantization levels on the feature location information, such as 4, 5, or 6 bits per feature. For example, a side of a hexagonal cell in the hexagonal grid can have a size of 2, 4, 8, 16, or 32 pixels. For each size of the hexagonal cell, entropy of the histogram map can have different bit rates per feature and different bit rates per image, and entropy of the histogram count can have different bit rates per feature, where the bit rates can vary for different images. Similarly, each size of the hexagonal cell, namely 2, 4, 8, 16, or 32 pixels, can yield different quantization levels on the feature location information. The histogram map and histogram count can be encoded separately, and spatial relationship of features of neighboring hexagonal cells can be used when coding the histogram map.

The method shown in FIG. 2 replaces square lattice partition of spatial feature locations with hexagonal lattice partition. With this approach, histogram of feature locations quantized to the hexagonal lattice is computed, and then the result of the computation is encoded. An objective of creating the feature location histogram is to reduce the number of bits needed for encoding the location information of each feature. Instead of coding the location information of each feature, one approach is to convert location information of the features into a location histogram, and code the location histogram. There are benefits in converting location information into a location histogram and coding the histogram. First, it allows for coding methods that do not based on the order of the coded items, and thus reduces the bit rate of the coding. In addition, since the features can be structural points in the image, spatial structure relationship among the features can be exploited in the coding process.

FIG. 3a illustrates a method of representing feature location information with a hexagonal plane in a three dimensional (3D) space according to some aspects of the present disclosure. As shown in FIG. 3a, the 3D space is shown as a cube 302 defined by the u axis, v axis, and w axis. A hexagonal plane 304 may be formed as shown with vertexes at 305, 306, 307, 308, 309, and 310. The center 312 of the hexagonal plane 304 in this example is also the center of the cube 302 with the coordinates (0.0, 0.0, and 0.0).

According to embodiments of the present disclosure, the method of representing feature location information with a hexagonal plane can project coordinates (x, y) of an image feature from a two dimensional (2D) space to the hexagonal plane 304 in a 3D space. A point in the 3D space is on the hexagonal plane when the sum of its u, v, and w coordinates satisfies the following condition.

$$u+v+w=0.$$

In one exemplary approach, the following matrix is used to transform a point in the 2D space to the 3D space:

$$M = \frac{1}{\sqrt{2}} \begin{pmatrix} 1 & 0 & -1 \\ \frac{1}{\sqrt{3}} & \frac{-2}{\sqrt{3}} & \frac{1}{\sqrt{3}} \end{pmatrix}.$$

And the above matrix satisfies the following condition:

$$M \cdot M^T = \begin{bmatrix} 1 & 0 \\ 0 & 1 \end{bmatrix}.$$

This means that transformation:

$$(u,v,w)=(x,y)\cdot M$$

can be reversible:

$$(x,y)=(u,v,w)\cdot M^T$$

An example of such transformation is shown in FIG. 3a. The hexagonal lattice on a plane u+v+w=0 is a set of points, such as points 314a and 314b, with integer coordinates:

$$(u,v,w)_{lattice} \in \mathbb{Z}^3.$$

According to embodiments of the present disclosure, a method of quantizing a transformed point in the 3D space includes the following computations.

Given a point q in the 3D space with coordinates $$q=(u_q, v_q, w_q)$$

define a point:

$$q'=(\rangle u_q\langle, \rangle v_q\langle, \rangle w_q\langle)$$

where $\rangle x \langle$ denotes nearest integer to real x.

Compute sum and verify whether the quantized point is on the hexagonal plane:

$$\Delta = \rangle u_q\langle + \rangle v_q\langle + \rangle w_q\langle.$$

If $\Delta=0$, which means the quantized point is on the hexagonal plane, then this process is completed. In other words, q' belongs to the hexagonal plane (u+v+w=0), and therefore it is a valid lattice point.

Compute errors:

$$\delta=(u_q-\rangle u_q\langle, v_q-\rangle v_q\langle, w_q-\rangle w_q\langle)$$

and sort the errors such that $$\tfrac{1}{2} \le \delta_1 \le \delta_2 \le \delta_3 \le \tfrac{1}{2}$$

If $\Delta>0$, subtract 1 from $\Delta$ components of q' having highest values of errors $\delta_i$. If $\Delta<0$, add 1 to $|\Delta|$ components of q' having smallest values of errors $\delta_i$. In order to control coarseness of mapping of image feature locations (x, y) to lattice points, a scale parameter $\sigma$ can be introduced. Note that the entire quantization process can be described as a series of transformations:

$$(x,y) \to (u,v,w) = \sigma^{-1}(x,y)M \to (u,v,w)_{lattice}$$

Reconstructed values (x', y') are obtained as follows:

$$(u,v,w)_{lattice} \to \sigma(u,v,w)_{lattice}M^T \to (x',y')$$

According to embodiments of the present disclosure, there are several techniques by which lattice points can be enumerated and encoded. One approach is to follow the order in which hexagonal cells appear as the method performs raster scan of image coordinates (x, y). Alternatively, the method enumerates hexagonal cells according to lexicographic order of values of their coordinates.

In some implementations, the method scans cells that contain image coordinates, and counts number of features that become mapped to each cell. After the histogram is computed, it can be mapped to a unique index and then encoded. As indicated above, the number of possible histograms with m cells and n total can be given by a multiset coefficient:

$$\left(\!\binom{m}{n}\!\right) = \binom{n+m-1}{m-1},$$

and the rate needed for representing a histogram index is:

$$R(m, n) = \left\lceil \log_2 \binom{n+m-1}{m-1} \right\rceil \text{bits}.$$

According to embodiments of the present disclosure, various coding techniques may be employed to code the histogram map 206 and histogram count 208 of FIG. 2. In one approach, histogram can be converted to a unique lexicographic index, and then encoded using fixed-length code with R(m,n) bits. Given a histogram with m bins, n total count, and individual counts $k_1, \ldots, k_m$ in each bin, a unique index $I(k_1, \ldots, k_m)$ may be obtained as follows, which is described by Y. A. Reznik in "An Algorithm for Quantization of Discrete Probability Distributions," *Proceedings of Data Compression Conference (DCC'11)*, pp. 333-343, March 2011, which is incorporated in its entirety by reference:

$$I(k_1, \ldots, k_m) = \sum_{j=1}^{m-2} \sum_{i=0}^{k_j-1} \binom{n - i - \sum_{l=1}^{j-1} k_l + m - j}{m - j} + k_{m-1}$$

This formula follows by induction (starting with m=2, 3, . . . ) and implements a lexicographic enumeration of types. For example, $$I(0, 0, \ldots, 0, n) = 0,$$
$$I(0, 0, \ldots, 1, n-1) = 1,$$
$$\ldots$$
$$I(n, 0, \ldots, 0, 0) = \binom{n+m-1}{m-1} - 1.$$

In another approach, empty blocks in the histogram map can be converted into run-lengths in raster scan order. The run-lengths are then coded using an entropy coder. The entropy coder may employ at least one of Golomb-Rice codes, Huffman codes, or arithmetic codes. In another approach, the method employs a variable-length coding scheme, that captures properties of spatial distributions of key points. In yet another approach, histogram values in several surrounding hexagonal cells are used as contexts. Such context configurations are further described in association with FIG. 4a and FIG. 4b.

Figure 4B:
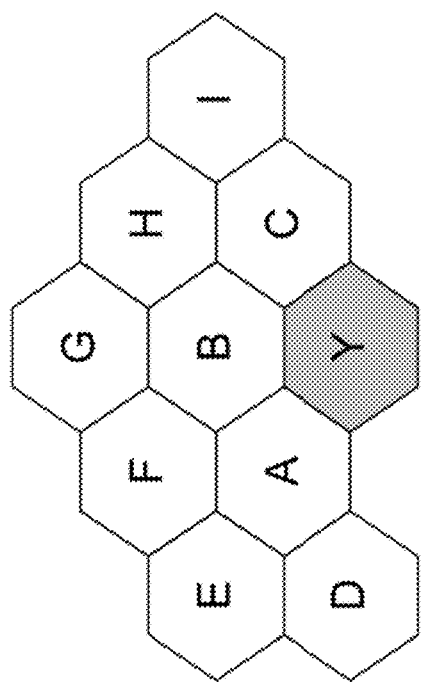
FIGS. 4a-4b illustrate applying context configurations for adaptive statistical encoding of histogram values according to some aspects of the present disclosure.
Figure 4A:
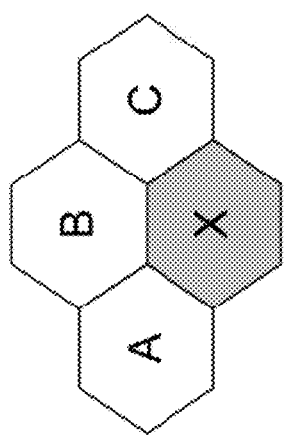

FIGS. 4a-4b illustrate applying context configurations for adaptive statistical encoding of histogram values according to some aspects of the present disclosure. In FIG. 4a, to encode a hexagonal cell X in the hexagonal grid, context information from first order neighbors A, B, and C can be used to encode the hexagonal histogram map and histogram count. In this example, the first order neighbors A, B, and C are hexagonal cells that have been previously encoded, and the hexagonal cell X is a subsequent hexagonal cell to be encoded. Similarly in FIG. 4b, to encode a hexagonal cell Y in the hexagonal grid, context information from first and second order neighbors, namely A, B, C, D, E, F, G, H, and I, can be used to encode the hexagonal histogram map and histogram count. The first order and second order neighbors A, B, C, D, E, F, G, H, and I are hexagonal cells that have been previously encoded, and the hexagonal cell Y is a subsequent hexagonal cell to be encoded.

Note that comparing to the square lattice, the hexagonal lattice offers better placement of points that can be used as contexts. For example, in FIG. 4a, three first order neighboring hexagonal cells A, B, and C can be used as contexts. While in a square lattice, there are only two such first order neighboring square cells available, namely the square cell above and the square cell on the left, assuming scan directions from left to right and top to bottom.

Note that hexagonal lattice produces thinner covering of the two dimensional (2D) space compared to square lattice. This improves accuracy of feature location representation. As shown in FIGS. 4a and 4b, mapping to hexagonal space is beneficial from context modeling and entropy coding standpoint. Note that the method of translating image feature locations to the hexagonal space does not modify actual pixel values, which means that it can be performed in an effective manner in terms of computational resources.

The following sections analyze benefits of coding feature location information utilizing a hexagonal lattice. One approach is to estimate rate-distortion characteristic of the proposed scheme and compare to the scheme of coding feature location information utilizing a square lattice.

Consider two lattice points: (0,0,0) and (0,1,1) and convert them back to pixel domain. Recall that such conversion is done by a mapping:

$$(u,v,w)_{lattice} \to \sigma(u,v,w)_{lattice} MT^T \to (x',y')$$

where σ is a scale parameter. This produces:

$$(0, 0, 0) \to \frac{\sigma}{\sqrt{2}} (0, 0, 0) \begin{pmatrix} 1 & \frac{1}{\sqrt{3}} \\ 0 & \frac{-2}{\sqrt{3}} \\ -1 & \frac{1}{\sqrt{3}} \end{pmatrix} = (0, 0); \text{ and}$$

$$(0, 1, 0) \to \frac{\sigma}{\sqrt{2}} (0, 1, 0) \begin{pmatrix} 1 & \frac{1}{\sqrt{3}} \\ 0 & \frac{-2}{\sqrt{3}} \\ -1 & \frac{1}{\sqrt{3}} \end{pmatrix} \to \left( 0, -\sqrt{\frac{2}{3}} \sigma \right)$$

The distance between these points in pixel domain is:

$$r = \frac{\sqrt{2}}{3}\sigma$$

Note that the same distance in lattice domain corresponds to height of the hexagon cell as shown in FIG. 3b is:

$$D = 2\rho = \sqrt{3}r.$$

The cell radius in pixel domain can be expressed as:

$$D = \sqrt{\frac{2}{3}}\sigma.$$

Similarly, the area occupied by a single hexagonal cell can be expressed as:

$$A = \frac{3\sqrt{3}}{2}r^2 = \frac{1}{\sqrt{3}}\sigma^2$$

Given an image with H×W pixels, it would need at least $$m = \frac{H\ W}{A} = \sqrt{3}\frac{H\ W}{\sigma^2}$$

hexagonal cells to cover it. The L2-norm based quantization error in this case equals to the covering radius:

$$\varepsilon_2 = r = \frac{\sqrt{2}}{3}\sigma.$$

This further produces the following relationship:

$$m(\varepsilon_2) = \sqrt{3}\frac{H\ W}{\sigma^2} = \frac{2}{3\sqrt{3}}\frac{H\ W}{\varepsilon_2^2},$$

as well as rate distortion function:

$$R_{hex}(\varepsilon_2) = \log\binom{n - m(\varepsilon_2) - 1}{m(\varepsilon_2) - 1}$$
$$= \log\binom{n - \frac{2}{3\sqrt{3}}\frac{H\ W}{\varepsilon_2^2} - 1}{\frac{2}{3\sqrt{3}}\frac{H\ W}{\varepsilon_2^2} - 1} \sim$$
$$n\log\frac{2}{3\sqrt{3}}\frac{H\ W}{\varepsilon_2^2} - \log n! \sim$$
$$n\left(\log\frac{2}{3\sqrt{3}}\frac{H\ W}{\varepsilon_2^2 n} - 1\right)$$
$$= n\left(\log\frac{H\ W}{\varepsilon_2^2 n} + \log\frac{2}{3\sqrt{3}} - 1\right)$$
$$\approx n\left(\log\frac{H\ W}{\varepsilon_2^2 n} - 2.37744\right)$$

In comparison, the rate distortion function for square lattice is:

$$R_{square}(\varepsilon_2) = \log\binom{n - m(\varepsilon_2) - 1}{m(\varepsilon_2) - 1}$$
$$= \log\binom{n - \frac{W\ H}{2\varepsilon_2^2} - 1}{\frac{W\ H}{2\varepsilon_2^2} - 1} \sim$$
$$n\log\frac{W\ H}{2\varepsilon_2^2} - \log n! \sim$$
$$n\left(\log\frac{W\ H}{2\varepsilon_2^2 n} - 1\right)$$
$$= n\left(\log\frac{W\ H}{\varepsilon_2^2 n} - 2\right)$$

Therefore, the proposed quantization scheme can save approximately $$\log_2\left(\frac{4}{3\sqrt{3}}\right) \approx 0.37744$$

bits/feature point, while retaining the same worst-case precision.

Figure 5:
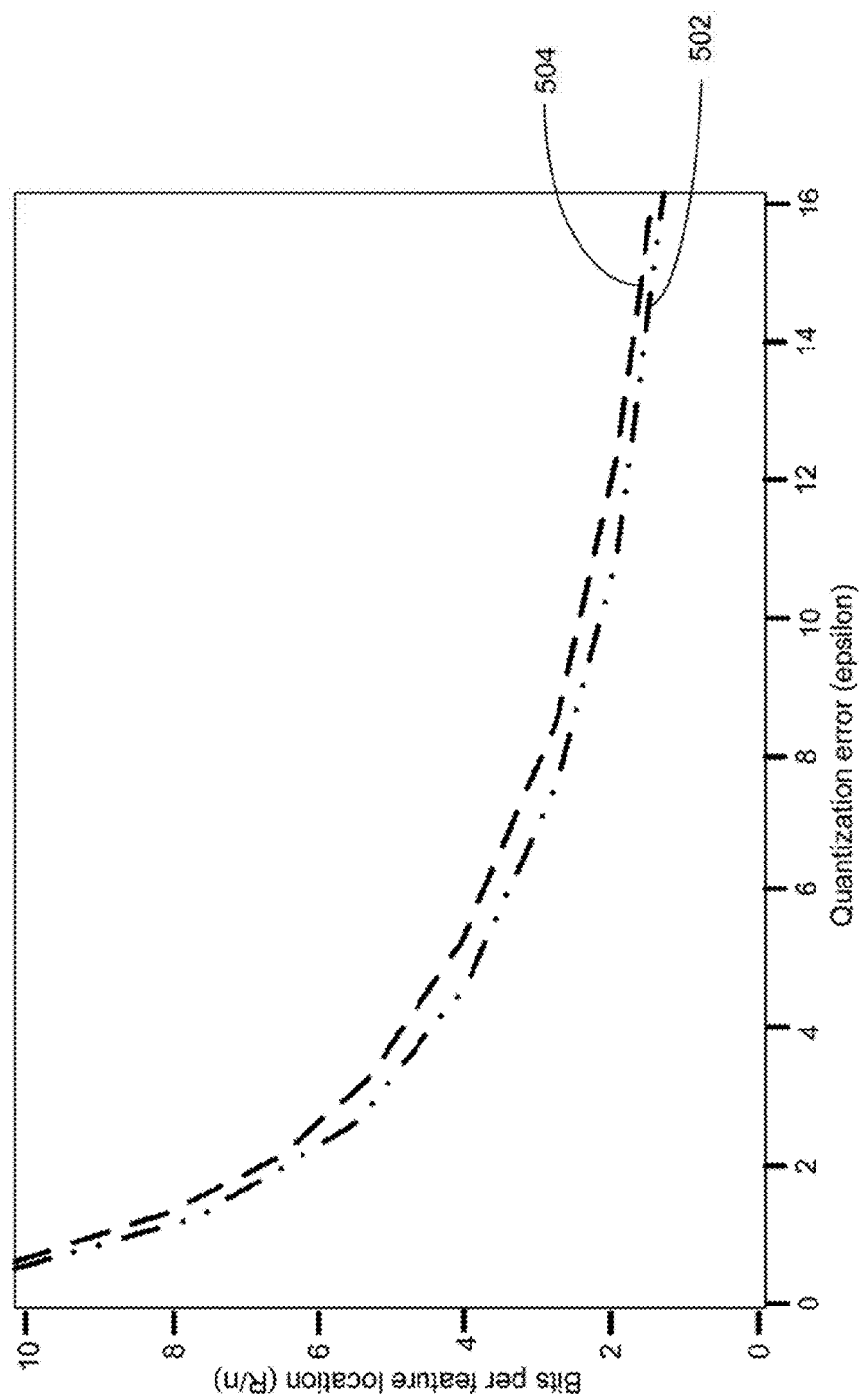
FIG. 5 illustrates a comparison of feature location coding schemes utilizing square lattice and hexagon lattice according to some aspect of the present disclosure.

FIG. 5 illustrates a comparison of feature location coding schemes utilizing square lattice and hexagon lattice according to some aspect of the present disclosure. Plot 502 represents bits per feature location over quantization error using a hexagonal lattice coding scheme. Plot 504 represents bits per feature location over quantization error using a square lattice coding scheme. Both plots use VGA images having about one thousand features. As shown in this example, if location coding operates at a bit rate of 5 bits/feature, the hexagonal lattice coding scheme has an approximately 8.16% improvement in the bit-rate over the square lattice coding scheme.

Embodiments of the present disclosure describe an improved technique for coding of image feature location information. The technique utilizes hexagonal lattice for quantization of feature locations, construction of a histogram of occurrences of feature locations in lattice cells, and encoding of this histogram. Performance of this technique is analyzed and compared to performance of histogram coding utilizing square lattice (scalar quantization of location parameters). It is shown that proposed scheme leads to appreciable improvement in bit rates of location coding. The technique is suitable for implementation on mobile platforms.

Disclosed methods may be applicable to mobile devices where visual search and augmenter reality (AR) systems rely on feature location information to perform a number of tasks. For example, feature location information can be used for 1) geometric verification of matches between images; 2) computing parameters of geometric transformation between views of same object; 3) locating and projecting boundaries of an object of interest; and 4) augmenting views of recognized objects in a captured image or video with additional information, and other purposes.

In some cases, AR and visual search systems can benefit if location information is represented in a compact and easy to use form. Compactness is particularly important if location information needs to be transmitted over wireless network. Some loss of precision of location information may also be allowed, but only to some extent, as it may affect retrieval accuracy as well as accuracy of localization of matching regions/objects and parameters of geometric transformation.

FIG. 6a illustrates a block diagram of a mobile device configured to perform visual search according to some aspects of the present disclosure. At the mobile device, antenna 602 receives modulated signals from a base station and provides the received signals to a demodulator (DE-MOD) part of a modem 604. The demodulator processes (e.g., conditions and digitizes) the received signal and obtains input samples. It further performs orthogonal frequency-division multiplexing (OFDM) demodulation on the input samples and provides frequency-domain received symbols for all subcarriers. An RX data processor 606 processes (e.g., symbol de-maps, de-interleaves, and decodes) the frequency-domain received symbols and provides decoded data to a controller/processor 608 of the mobile device.

The controller/processor 608 can be configured to control the mobile device to communicate with a server via a wireless network. A TX data processor 610 generates signaling symbols, data symbols, and pilot symbols, which can be processed by modulator (MOD) of modem 604 and transmitted via the antenna 602 to a base station. In addition, the controller/processor 608 directs the operation of various processing units at the mobile device. Memory 612 can be configured to store program codes and data for the mobile device. Image module 616 can be configured to obtain an image. Visual search module 614 can be configured to implement methods of coding feature location information of an image as well as methods of image retrieval described below.

According to embodiments of the present disclosure, content-based image retrieval can use an approach that is referred to as "Bag of Features" (BoF) or "Bag of Words" (BoW). The BoW approach is derived from text document retrieval. To find a particular text document, such as a web page, it is sufficient to use a few well chosen words. In the database, the document itself can likewise be represented by a "bag" of salient words, regardless of where these words appear in the document. For images, robust local features that are characteristic of a particular image take the role of "visual words." Like text retrieval, BoF image retrieval does not consider where in the image the features occur, at least in the initial stages of the retrieval pipeline.

Figure 6C:
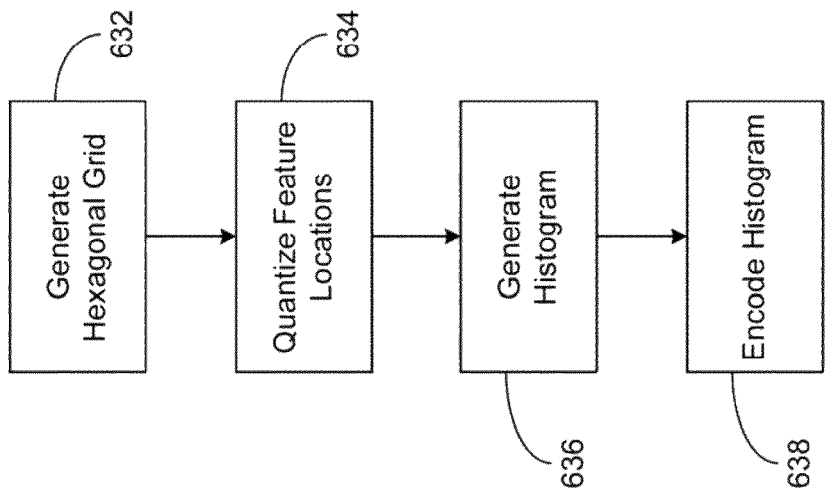
FIG. 6c illustrates a method of coding feature location information of an image according to embodiments of the present disclosure.
Figure 6B:
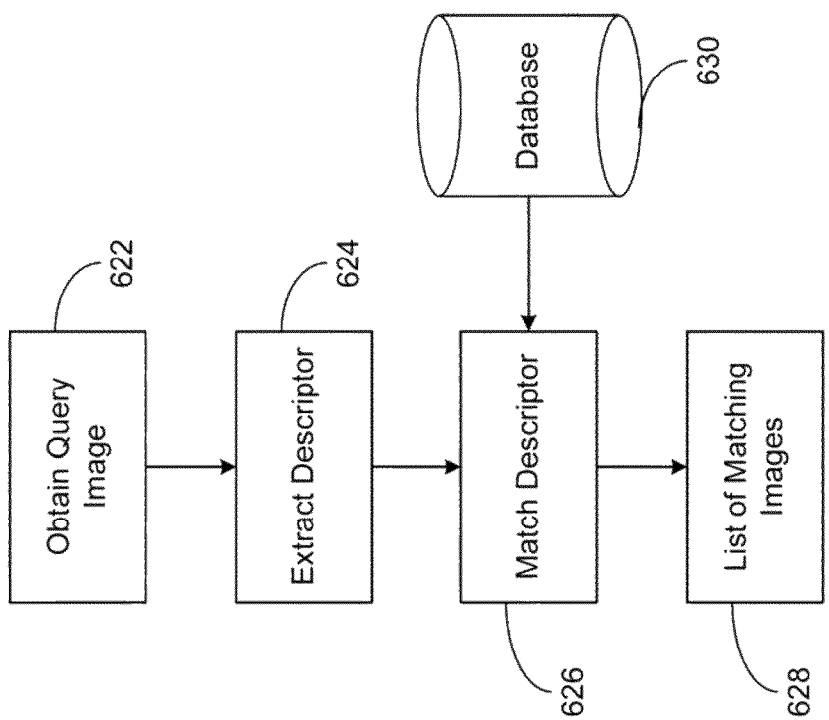
FIG. 6b illustrates a method for image retrieval according to embodiments of the present disclosure.

FIG. 6b illustrates a method for image retrieval according to embodiments of the present disclosure. In block 622, the method obtains a query image. In block 624, local image features/descriptors are extracted from the query image. In block 626, such descriptors are then matched against descriptors of images stored in the database 630. The descriptor matching function may further include matching of local image features, selecting images with highest scores, and performing geometric verification. In block 628, the images that have many features in common with the query image are then selected and listed. The geometric verification step described below can be used to reject matches with feature locations that cannot be plausibly explained by a change of viewing position.

The method shown in FIG. 6b can be implemented as a pipeline for large-scale image retrieval. First, local features (also referred to as descriptors) are extracted from the query image. The set of local features is used to assess the similarity between query and database images. To be useful for mobile applications, individual features should be robust against geometric and photometric distortions encountered when the user takes the query photo from a different viewpoint, and with different lighting compared to the corresponding database image. Next, query features are matched to features of images stored in the database. This can be accomplished by using special index structures, allowing fast access to lists of images containing matching features. Based on the number of features they have in common with the query image, a short list of potentially similar images is selected from the database. Finally, a geometric verification step is applied to the most similar matches in the database. Geometric verification finds a coherent spatial pattern between features of the query image and the features of the candidate database image to ensure that the match is correct.

FIG. 6c illustrates a method of coding feature location information of an image according to embodiments of the present disclosure. As shown in FIG. 6c, in block 632, the method generates a hexagonal grid that includes a plurality of hexagonal cells, and determines size of the hexagonal cells based on a predetermined quantization level (such as 4, 5, or 6 bits per feature) of feature location information.

In block 634, the method quantizes feature locations of an image using the hexagonal grid. For each feature location, the method generates transformed coordinates of the feature location from a two dimensional plane to a three dimensional space, rounds the transformed coordinates to corresponding nearest integers, and verifies the transformed coordinates belong to a hexagonal plane in the three dimensional space. Verifying the transformed coordinates is done by computing a sum of the transformed coordinates, and verifying the sum of the transformed coordinates equals to zero.

In block 636, the method generates a histogram to record occurrences of feature locations in each hexagonal cell. The histogram includes a histogram map configured to include occurrences of feature locations in each hexagonal cell, and a histogram count configured to describe number of occurrences of feature locations in each hexagonal cell.

In block 638, the method encodes the histogram in accordance with the occurrences of feature locations in each hexagonal cell. The method converts the histogram to a unique lexicographic index, and encodes the unique lexicographic index using a fixed-length code. In addition, the method converts empty blocks of the histogram into run-lengths in raster scan order, and encodes the run-lengths using an entropy coder. The entropy coder may employ Golomb-Rice codes, Huffman codes, or arithmetic codes.

In another approach, encoding the histogram may apply context information of neighboring hexagonal cells to encode information of a subsequent hexagonal cell to be encoded in the histogram. The context information includes context information from first order neighbors and second order neighbors of the subsequent hexagonal cell to be encoded. The context information is used as input for the arithmetic encoder.

According to embodiments of the present disclosure, Golomb-Rice coding is a lossless data compression method using a family of data compression codes, where alphabets following a geometric distribution can have a Golomb-Rice code as a prefix code in an adaptive coding scheme. The Golomb-Rice codes have tunable parameters as a power of two, which makes them convenient for use on a computer, since multiplication and division by two can be implemented more efficiently in binary arithmetic. Huffman coding uses a variable-length code table for encoding a source symbol for lossless data compression. The variable-length code table can be derived based on the estimated probability of occurrence for each possible value of the source symbol. Huffman coding uses a specific method for choosing the representation for each symbol, resulting in a prefix code that expresses the most common source symbols using shorter strings of bits than are used for less common source symbols. For a set of symbols with a uniform probability distribution and a number of members being a power of two, Huffman coding is equivalent to binary block encoding. Arithmetic coding is a form of variable-length entropy encoding used in lossless data compression. A string of characters can be represented using a fixed number of bits per character, as in the ASCII code. When a string is converted to arithmetic encoding, frequently used characters can be stored with fewer bits and not-so-frequently occurring characters can be stored with more bits, resulting in fewer bits used in total. Arithmetic coding differs from other forms of entropy encoding such as Huffman coding in that rather than separating the input into component symbols and replacing each with a code, arithmetic coding encodes the entire message into a single number, a fraction n where ($0.0 \leq n < 1.0$).

FIGS. 7a-7b illustrate exemplary implementations of visual search functionality according to embodiments of the present disclosure. Methods of coding feature location information as described in the present disclosure may be implemented in a client and server environment as shown in FIG. 7a and FIG. 7b.

As shown in FIG. 7a, the system includes a mobile device 702 (for example a mobile phone), a visual search server 704, and a wireless network 706. The mobile device 702 includes image capture module 703, image encoding module 705, and process and display results module 707. The visual search server 704 includes image decoding module 711, descriptor extraction module 713, descriptor matching module 715, search results module 717, and database 719. Components of the mobile device 702, the wireless network 706, and the visual search server 704 are communicatively coupled as shown in the flow diagram of FIG. 7a. The mobile device 702 analyzes the query image, extracts local image features (descriptors), and transmits feature data. The retrieval methods run on the visual search server 704 using the transmitted features as the query to perform the search.

In the example shown in FIG. 7b, the system includes a mobile device 722 (shown as a mobile phone), a visual search server 724, and a wireless network 726. The mobile device 722 includes image capture module 723, descriptor extraction module 725, descriptor encoding module 727, descriptor matching module 729, decision branch 731, process and display results module 733, and local database (D/B) or cache 735. The visual search server 724 includes descriptor decoding module 741, descriptor matching module 743, search results module 745, and database 747. Components of the mobile device 722, the wireless network 726, and the visual search server 724 are communicatively coupled as shown in the flow diagram of FIG. 7b. The mobile device 722 maintains a cache of the database and performs image matching locally. In the event if a match is not found, the mobile device 722 sends a query request to the visual search server 724. In this manner, it further reduces the amount of data sent over the network.

In each case of FIG. 7a and FIG. 7b, the retrieval framework can adapt to stringent mobile system requirements. The processing on the mobile device needs to be fast and economical in terms of power consumption. The size of the data transmitted over the network needs to be as small as possible to minimize network latency and thus provide the best user experience. The methods used for retrieval need to be scalable to potentially very large databases, and capable of delivering accurate results with low latency. Further, the retrieval system needs to be robust to allow reliable recognition of objects captured under a wide range of conditions, including different distances, viewing angles, and lighting conditions, or in the presence of partial occlusions or motion blur.

The feature extraction process identifies salient interest points in the image. For robust image matching, such interest points need to be repeatable under perspective transformations (such as scale changes, rotation, and translation) and lighting variations. To achieve scale invariance, interest points can be computed at multiple scales using an image pyramid. To achieve rotation invariance, the patch around each interest point is oriented in the direction of the dominant gradient. The gradients in each path are further normalized to make them robust to illumination changes.

Note that the different interest point detectors provide different trade-offs in repeatability and complexity. For example, the difference-of-Gaussian (DoG) points generated by SIFT can be slow to compute, but it can be highly repeatable; while a corner detector approach can be fast but it offers lower repeatability. Among various approaches that can achieve a good tradeoff between repeatability and complexity is a Hessian-blob detector sped up with integral images. Using this approach for VGA images, interest point detection can be carried out in approximately less than one second on some current mobile phones.

After interest point detection, "visual word" descriptors are computed using small image patches around such points. One challenge in computing feature descriptors is to make them highly discriminative of characteristic of an image or a small set of images. Descriptors that occur in almost every image (for example the equivalent of the word "and" in text documents) would not be useful for retrieval.

In one implementation, the process of computing the descriptor is described as follows:

The patch is divided into several (for example 5 to 9) spatially localized bins;

The joint (dx,dy) gradient histogram in each spatial bin is then computed. CHoG histogram binning exploits typical skew in gradient statistics that are observed for patches extracted around key points; and Histogram of gradients from each spatial bin is quantized and stored as part of the descriptor.

In the implementation above for extracting features of an image, interest points (e.g. corners, blobs) at different scales are extracted. The patches at different scales are oriented along the most dominant gradient. The descriptor is computed using canonically oriented and normalized patches. The patch is divided into localized spatial bins, and it gives robustness to interest point localization error. The distribution of gradients in each spatial bin is compressed directly to obtain a compact description of the patch.

The use of histograms allows information distance measures, such as KL-divergence to be employed for assessing degree of mismatch between image features. Histograms also allow simple and effective encoding. In some examples, only 50-60 bits are needed to turn each patch into a compressed histogram-based descriptor.

Mobile AR and visual search systems that transmit or store local image features need to encode (and/or multiplex) sets of features and feature location information efficiently. Feature location information also needs to be encoded, as it is needed for geometric verification. For matching accuracy, in one approach, at least 500 local features are usually needed. Such features are usually highly correlated spatially. As shown in FIG. 2 to FIG. 4 above, encoding of feature location information can be accomplished by first quantizing it to a 2-D histogram, and then using context-based arithmetic coding technique to exploit spatial correlation. This technique can achieve about 5 bits/feature coding rate, while delivering sufficiently high precision of representation of feature location information.

The encoding of the entire set of local features and their corresponding locations can be accomplished by transmitting feature location histogram first, and then transmitting features in order, in which their locations appear in decoding the histogram. For example, if histogram indicates that block (x,y) includes three features, then the encoder can output codes of three corresponding descriptors sequentially in the bit stream.

Using compact descriptors, such as the one described above and feature location coding, a query image with 500 features can be represented by approximately 4K bytes (500× (60+5)/8). Considering that a JPEG compressed query image usually takes about 40-80K bytes, the disclosed approach represents an order of magnitude reduction in the bit-rate.

For indexing and matching features of an image in a large database of images, the disclosed embodiments use a data structure that returns a shortlist of the database candidates that are likely to match the query image. The shortlist may contain false positives, as long as the correct match is included. Slower pairwise comparisons can subsequently be performed on just the shortlist of candidates rather than the entire database.

Various data structures can be employed for indexing local features in image database. One approach is to use approximate nearest neighbor (ANN) search of SIFT descriptors with a best-bin-first strategy. In addition, a Bag of Features (BoF) model may be used. The BoF codebook is constructed by k-means clustering of training set of descriptors. During a query, scoring the database images can be performed by using an inverted file index associated with the BoF codebook. To generate a large codebook, a hierarchical k-means clustering can be utilized to create a vocabulary tree (VT). Other search techniques, such as Locality-Sensitive Hashing (LSH), and improvements in traditional tree-based approaches can also be used.

FIG. 8a illustrates a method of constructing a vocabulary tree by hierarchical k-means clustering of training feature descriptors according to embodiments of the present disclosure. The vocabulary tree shown in this example has 2 levels. Using branching factor k=3, and the vocabulary tree has k^2=9 leaf nodes. FIG. 8b illustrates a vocabulary tree and an associated inverted index according to embodiments of the present disclosure. The inverted index contains lists of images and counters indicating number of features in files follow same path in vocabulary tree.

As shown in FIGS. 8a-8b, a vocabulary tree (VT) and its associated inverted index structures are used in indexing and matching image features. The VT for a database can be constructed by performing a hierarchical k-means clustering on a set of training feature descriptors representative of the database, as illustrated in FIG. 8a. Initially, k large clusters are generated for all the training descriptors. This is done by using a k-means algorithm (quantize to k cells) with an appropriate distance function, such as L2-norm or a symmetric form of KL-divergence. Then, for each large cluster, k-means clustering is applied to the training descriptors assigned to that cluster, to generate k smaller clusters. This recursive division of the descriptor space is repeated until there are enough bins to ensure good classification performance. For example, in practice, one can use a VT design with height 6, branching factor k=10, and producing 1 million ($10^6$) nodes.

The inverted index associated with the VT maintains two lists per leaf node, as shown in FIG. 8b. For a leaf node x, there is a sorted array of image identifiers $\{i_{x1}, \ldots, i_{xNx}\}$ indicating which $N_x$ database images have features that belong to a cluster associated with this node. Similarly, there is a corresponding array of counters $\{C_{x1}, \ldots, C_{xNx}\}$ indicating the number of features in each corresponding image fall in same cluster.

During a query, the VT is traversed for each feature in the query image, finishing at one of the leaf nodes each time. The corresponding lists of images and frequency counts are subsequently used to compute similarity scores between these images and the query image. The standard Term Frequency-Inverse Document Frequency (TF-IDF) weighting scheme can be employed for computation of such scores. By pulling images from all these lists and ranking them according to the scores, a subset of database images can be derived that is likely to contain a true match to the query image. Since only a small number of lookups needs to be executed per each query feature, and lists of all relevant files are directly available from the inverted index, this scheme can scale to support large databases.

Geometric verification is performed after feature matching. In this stage, location information of features in query and database images are used to confirm that the feature matches are consistent with a change in viewpoint between the two images. The geometric transform between query and database image is estimated using a regression techniques. The transformation is usually represented by the fundamental matrix which incorporates 3-D geometry, homography, or affine models.

Note that paragraph [0090], FIG. 2, FIGS. 6a-6c and their corresponding descriptions provide means for generating a hexagonal grid that includes a plurality of hexagonal cells, means for quantizing feature locations of an image using the hexagonal grid, means for generating a histogram to record occurrences of feature locations in each hexagonal cell, and means for encoding the histogram in accordance with the occurrences of feature locations in each hexagonal cell. Paragraph [0090], FIG. 2, FIGS. 3a-3b, FIGS. 6a-6c and their corresponding descriptions provide means for generating transformed coordinates of the feature location from a two dimensional plane to a three dimensional space, means for rounding the transformed coordinates to corresponding nearest integers, and means for verifying the transformed coordinates belong to a hexagonal plane in the three dimensional space. Paragraph [0090], FIG. 2, FIGS. 6a-6c and their corresponding descriptions provide means for generating a histogram map configured to include occurrences of feature locations in each hexagonal cell, and means for generating a histogram count configured to describe number of occurrences of feature locations in each hexagonal cell. Paragraph [0090], FIGS. 4a-4b, FIGS. 6a-6c and their corresponding descriptions provide means for applying context information of neighboring hexagonal cells to encode information of a subsequent hexagonal cell to be encoded in the histogram.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of coding feature location information of an image, comprising:
   generating a hexagonal grid, wherein the hexagonal grid includes a plurality of hexagonal cells;
   quantizing feature locations of an image using the hexagonal grid, wherein the quantizing feature locations comprises: for each feature location, generating transformed coordinates of the feature location from a two dimensional plane to a three dimensional space, rounding the transformed coordinates to corresponding nearest integers, and verifying the transformed coordinates belong to a hexagonal plane in the three dimensional space;

generating a histogram to record occurrences of feature locations in each hexagonal cell; and encoding the histogram in accordance with the occurrences of feature locations in each hexagonal cell.

2. The method of claim 1, wherein generating a hexagonal grid comprises:

determining size of the hexagonal cells in accordance with a predetermined quantization level of feature location information.

3. The method of claim 1, wherein verifying the transformed coordinates comprises:

computing a sum of the transformed coordinates; and verifying the sum of the transformed coordinates equals to zero.

4. The method of claim 1, wherein generating a histogram comprises:

generating a histogram map configured to include occurrences of feature locations in each hexagonal cell.

5. The method of claim 4 further comprises:

generating a histogram count configured to describe number of occurrences of feature locations in each hexagonal cell.

6. The method of claim 1, wherein encoding of histogram comprises:

converting the histogram to a unique lexicographic index; and encoding the unique lexicographic index using a fixed-length code.

7. The method of claim 1, wherein encoding of histogram further comprises:

converting empty blocks of the histogram into run-lengths in raster scan order; and encoding the run-lengths using an entropy coder.

8. The method of claim 7, wherein the entropy coder employs Golomb-Rice codes.

9. The method of claim 7, wherein the entropy coder employs Huffman codes.

10. The method of claim 7, wherein the entropy coder employs arithmetic codes.

11. The method of claim 1, wherein encoding the histogram further comprises:

applying context information of neighboring hexagonal cells to encode information of a subsequent hexagonal cell to be encoded in the histogram.

12. The method of claim 11, wherein the context information comprises:

context information from first order neighbors of the subsequent hexagonal cell to be encoded.

13. The method of claim 12, wherein the context information further comprises:

context information from second order neighbors of the subsequent hexagonal cell to be encoded.

14. The method of claim 11, wherein context information is used as input for arithmetic encoder.

15. A mobile device, comprising:

an image module configured to obtain an image;

a visual search module configured to generate encoded feature location information of the image; and a controller configured to communicate the encoded feature location information of the image to a server via a wireless network;

wherein the visual search module includes logic for generating a hexagonal grid, wherein the hexagonal grid includes a plurality of hexagonal cells;

logic for quantizing feature locations of an image using the hexagonal grid, wherein the logic for quantizing feature locations comprises: for each feature location, logic for generating transformed coordinates of the feature location from a two dimensional plane to a three dimensional space, logic for rounding the transformed coordinates to corresponding nearest integers, and logic for verifying the transformed coordinates belong to a hexagonal plane in the three dimensional space;

logic for generating a histogram to record occurrences of feature locations in each hexagonal cell; and logic for encoding the histogram in accordance with the occurrences of feature locations in each hexagonal cell.

16. The mobile device of claim 15, wherein logic for generating a hexagonal grid comprises:

logic for determining size of the hexagonal cells in accordance with a predetermined quantization level of feature location information.

17. The mobile device of claim 15, wherein logic for verifying the transformed coordinates comprises:

logic for computing a sum of the transformed coordinates; and logic for verifying the sum of the transformed coordinates equals to zero.

18. The mobile device of claim 15, wherein logic for generating a histogram comprises:

logic for generating a histogram map configured to include occurrences of feature locations in each hexagonal cell.

19. The mobile device of claim 18 further comprises:

logic for generating a histogram count configured to describe number of occurrences of feature locations in each hexagonal cell.

20. The mobile device of claim 15, wherein logic for encoding of histogram comprises:

logic for converting the histogram to a unique lexicographic index; and logic for encoding the unique lexicographic index using a fixed-length code.

21. The mobile device of claim 15, wherein logic for encoding of histogram further comprises:

logic for converting empty blocks of the histogram into run-lengths in raster scan order; and logic for encoding the run-lengths using an entropy coder.

22. The mobile device of claim 15, wherein logic for encoding the histogram further comprises:

logic for applying context information of neighboring hexagonal cells to encode information of a subsequent hexagonal cell to be encoded in the histogram.

23. The mobile device of claim 22, wherein the context information comprises:

context information from first order neighbors of the subsequent hexagonal cell to be encoded.

24. The mobile device of claim 23, wherein the context information further comprises:

context information from second order neighbors of the subsequent hexagonal cell to be encoded.

25. A mobile device, comprising:

an image module configured to obtain an image;

a visual search module configured to generate encoded feature location information of the image; and a controller configured to communicate the encoded feature location information of the image to a server via a wireless network;

wherein the visual search module includes means for generating a hexagonal grid, wherein the hexagonal grid includes a plurality of hexagonal cells;

means for quantizing feature locations of an image using the hexagonal grid, wherein means for quantizing feature locations comprises: for each feature location, means for generating transformed coordinates of the feature location from a two dimensional plane to a three dimensional space, means for rounding the transformed coordinates to corresponding nearest integers, and means for verifying the transformed coordinates belong to a hexagonal plane in the three dimensional space;

means for generating a histogram to record occurrences of feature locations in each hexagonal cell; and means for encoding the histogram in accordance with the occurrences of feature locations in each hexagonal cell.

26. The mobile device of claim 25, wherein means for generating a histogram comprises:

means for generating a histogram map configured to include occurrences of feature locations in each hexagonal cell.

27. The mobile device of claim 26 further comprises:

means for generating a histogram count configured to describe number of occurrences of feature locations in each hexagonal cell.

28. The mobile device of claim 25, wherein means for encoding the histogram further comprises:

means for applying context information of neighboring hexagonal cells to encode information of a subsequent hexagonal cell to be encoded in the histogram.

29. The mobile device of claim 28, wherein the context information comprises:

context information from first order neighbors of the subsequent hexagonal cell to be encoded.

30. The mobile device of claim 29, wherein the context information further comprises:

context information from second order neighbors of the subsequent hexagonal cell to be encoded.

31. A computer program product for coding feature location information of an image, comprising a non-transitory medium storing computer programs for execution by one or more computer systems, the computer program product comprising:

code for generating a hexagonal grid, wherein the hexagonal grid includes a plurality of hexagonal cells;

code for quantizing feature locations of an image using the hexagonal grid, wherein code for quantizing feature locations comprises: for each feature location, code for generating transformed coordinates of the feature location from a two dimensional plane to a three dimensional space, code for rounding the transformed coordinates to corresponding nearest integers, and code for verifying the transformed coordinates belong to a hexagonal plane in the three dimensional space;

code for generating a histogram to record occurrences of feature locations in each hexagonal cell; and code for encoding the histogram in accordance with the occurrences of feature locations in each hexagonal cell.

32. The computer program product of claim 31, wherein code for generating a histogram comprises:

code for generating a histogram map configured to include occurrences of feature locations in each hexagonal cell.

33. The computer program product of claim 32 further comprises:

code for generating a histogram count configured to describe number of occurrences of feature locations in each hexagonal cell.

34. The computer program product of claim 32, wherein code for encoding the histogram further comprises:

code for applying context information of neighboring hexagonal cells to encode information of a subsequent hexagonal cell to be encoded in the histogram.

* * * * *